United States Patent [19]
Segerdahl et al.

[11] 3,713,343
[45] Jan. 30, 1973

[54] DEVICE FOR MEASURING ACCELERATIONS

[75] Inventors: Roy R. Segerdahl, Bellmore; Theodor Erb, Forest Hills, both of N.Y.

[73] Assignee: Sperry Rand Corporation, Ford Instrument Company Division, Long Island City, N.Y.

[22] Filed: July 30, 1957

[21] Appl. No.: 675,800

[52] U.S. Cl. .............................................. 73/517 R
[51] Int. Cl. .......................................... G01p 15/08
[58] Field of Search ........... 244/77, 77 A, 77 B, 77 C; 264/1 AS; 33/204; 73/180, 65, 503, 504, 514, 515, 516, 517, 518

[56] References Cited

UNITED STATES PATENTS

| | | | |
|---|---|---|---|
| 2,377,212 | 5/1945 | Cottrell | 73/517 |
| 2,613,071 | 10/1952 | Hansel | 73/517 |

*Primary Examiner*—Benjamin A. Borchelt
*Assistant Examiner*—C. T. Jordan
*Attorney*—Borst and Borst

EXEMPLARY CLAIM

1. An accelerometer for providing the acceleration of a vehicle at a first point therein, comprising a first means for yielding the acceleration $\bar{A}_1$ of the vehicle at a second point disposed at a distance $r_1$ from the first point, a second means for yielding the acceleration $\bar{A}_2$ of the vehicle at a third point disposed at a distance $r_2$ from the first point, and computing means connected to said first and second means for yielding the acceleration $\bar{A}$ of the vehicle at the first point in accordance with the formula $$\bar{A} = \bar{A}_1 - \left(\frac{1}{1 - r_2/r_1}\right)(\bar{A}_1 - \bar{A}_2) x$$

$\bar{A}_1$ being equal to $\bar{A} + \bar{e}_1$, $\bar{A}_2$ being equal to $\bar{A} + \bar{e}_2$ and $\bar{e}_2$ being equal to $\bar{e}_1(r_2/r_1)$ where $\bar{e}_1$ is the acceleration of the second point about the first point and $\bar{e}_2$ is the acceleration of the third point about the first point.

9 Claims, 3 Drawing Figures

DEVICE FOR MEASURING ACCELERATIONS

This invention relates to accelerometers and more particularly to accelerometers for omnidirectional measurements.

In some classes of vehicles, and especially aircraft, the axes of the vehicle may assume arbitrary and changing angles in relation to the path of its movement. As the conventional type of accelerometer is usually a unidirectional or bidirectional measuring device which has to be oriented in a fixed manner relative to the vehicle, it frequently becomes necessary to employ three accelerometers, one oriented on each of three mutually perpendicular axes, for effecting the necessary measurements.

An object of this invention is to provide an improved accelerometer for omnidirectional measurements.

Furthermore, it is frequently not practical to locate the accelerometer at a pertinent reference point in the vehicle, such as its center of gravity. In such cases, an angular movement of the vehicle around the reference point will be accompanied by additional accelerations, and the resultant acceleration as measured by an accelerometer at other than the center of rotation will differ from the acceleration of the reference point.

Another object of this invention is to provide a new accelerometer system for furnishing omnidirectional acceleration measurements related to a reference point in a vehicle from instrument positions at other than the reference point in the vehicle.

In general, the force which is required to accelerate a mass component of an inertia type of accelerometer may be exerted omnidirectionally by the vehicle upon the mass when the mass is spring suspended along three mutually perpendicular axes which intersect at the center of gravity of the mass. Any acceleration of the vehicle will effect a displacement of the mass from its normal or zero acceleration position which, when measured, will represent both the direction and magnitude of the absolute acceleration of the vehicle.

In general, the invention contemplates the provision of a supporting spring structure for the mass which includes a sensor element disposed along each of the three mutually perpendicular axes, the sensor elements having a variable electrical characteristic which is controlled by the displacement of its associated spring. A vector addition of the changes in the electrical characteristics of the sensors will provide the absolute acceleration at the discrete location of the mass for any general movement of the vehicle.

When the mass component of an accelerometer cannot be located at a pertinent reference point in the vehicle, such as its center of gravity, omnidirectional accelerometers are positioned at two convenient locations in the vehicle. As the vehicle may be rotating about its center of gravity in addition to being linearly accelerated, each instrument will furnish the resultant acceleration at its location. These data measurements can be mathematically processed in accordance with formulas to be derived hereinafter by addition, subtraction and multiplication operations for yielding both the lineal acceleration of the center of gravity of the vehicle and the relative acceleration of the vehicle at the instrument points about its center of gravity.

Other capabilities of the invention will be understood more clearly from the following detailed description taken in conjunction with the accompanying drawings in which.

Figure 1:
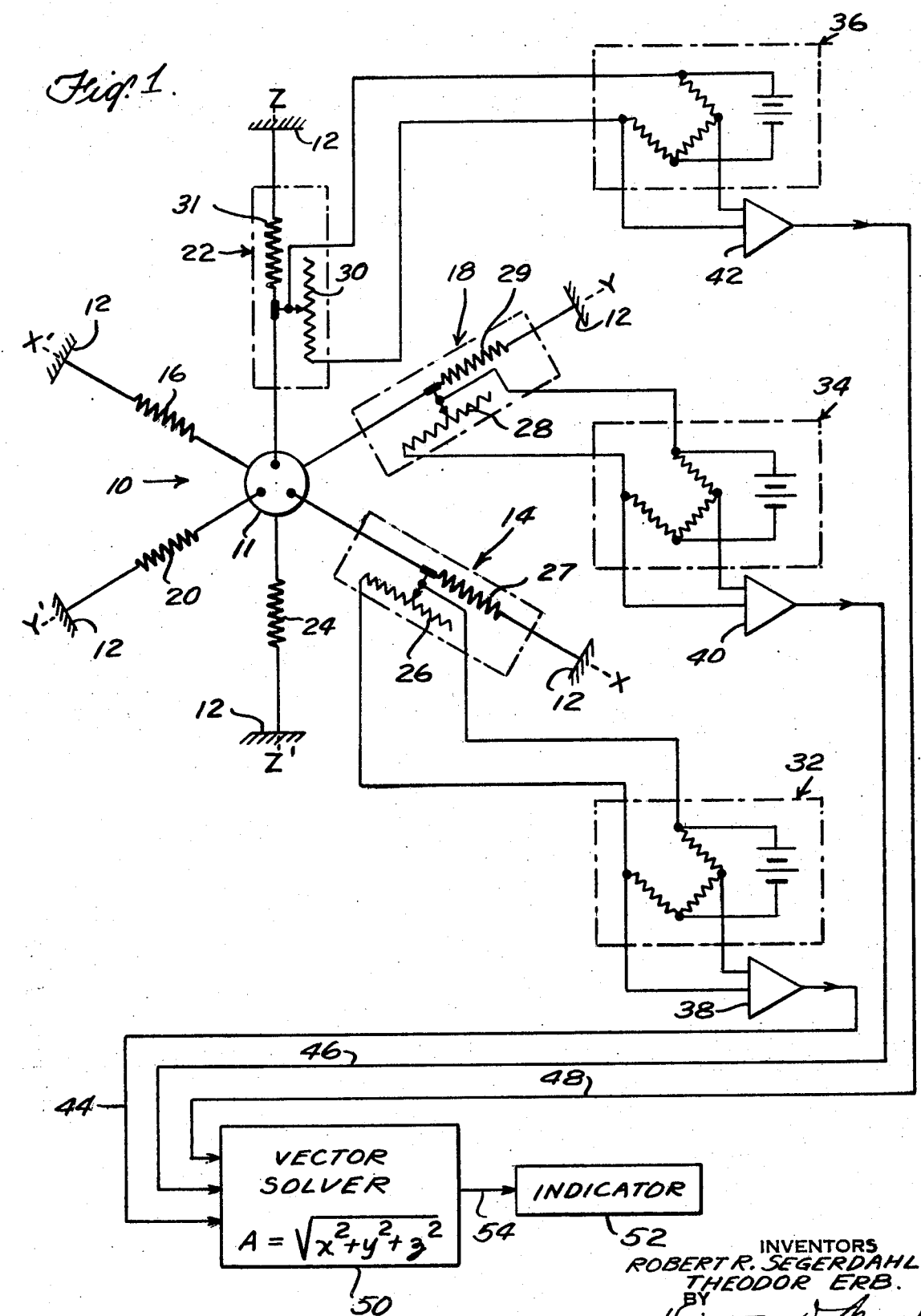
FIG. 1 is a schematic diagram of an omnidirectional accelerometer.

In FIG. 1, the sensor element 10 of the invention is illustrated as including a spherical mass 11 suspended from the frame of a vehicle 12 along three mutually perpendicular lines X–X', Y–Y' and Z–Z'; the perpendicular lines intersecting each other at the center of gravity of the mass 11. The suspension system comprises a tension indicator 14 and a spring 16 disposed along the axis X–X' on opposite sides of the mass 11, a tension indicator 18 and a spring 20 disposed along the axis Y–Y' on opposite sides of the mass 11, and a tension indicator 22 and a spring 24 disposed along the axis Z–Z' on opposite sides of the mass 11. Each of the six springs in the suspension system are matched for identical first power proportionality characteristics of displacement vs. force and the configuration of the suspension system is selected so that the length of the supports from the mass to the vehicle is relatively large compared to the anticipated displacements of the mass resulting from the maximum acceleration of the vehicle. Also the connections of the supports at the mass 11 and the vehicle 12 are selectively designed to prevent the transmission of any tangential forces to the tension indicators which would introduce errors in the proportionality of its output to lineal displacements.

The tension indicators 14, 18 and 22 include a variable resistor 26, 28 and 30, respectively, and a tension spring 27, 29 and 31, respectively. A variable resistance slider is connected to the inner end of each tension spring. The change in resistance of each variable resistor as determined by the spring controlled slider is substantially proportional to the lineal displacement of its associated tension spring. The variable resistor 26 and slider are connected across the input side of a balanced bridge network 32, the variable resistor 28 and slider are connected across the input side of a balanced bridge network 34, and the variable resistor 30 and slider are connected across the input side of a balanced bridge network 36. Bridge networks 32, 34 and 36 are connected to drive amplifiers 38, 40 and 42, respectively. The output sides of the amplifiers 38, 40 and 42 are connected by cables 44, 46 and 48 to a vector solver which yields an output to an indicator 52, through a cable 54 connected there between, in accordance with formula $\sqrt{x^2+y^2+z^2}$, wherein $x$ is the voltage in the input cable 44, $y$ is the voltage in the input cable 46 and $z$ is the voltage in the input cable 48. Square root devices and devices for combining vector quantities as by addition, subtraction and multiplication are well known in the computer art and are described in publications including text books on analog computers. See, for example, Radiation Laboratory Series, Volume 21, McGraw Hill, 1948.

Any acceleration of the vehicle acting upon the inertia of the mass 11 through the tension indicators 14, 18 and 22 permits the mass 11 to assume the position of a vector having a magnitude directly proportional to the vehicle acceleration due to the first power displacement vs. force proportionality of the individual components of the spring suspension. eliminated After adjusting the bridge networks 32, 34 and 36 to provide a zero output for either a quiescent or a steady state movement of the vehicle, the indicator 52 will directly provide the absolute acceleration of the vehicles as a consequence of the measurements of any resulting displacement of the mass 11 by the change in resistance of the tension indicators 14, 18 and 22, the changes in resistance being measured by the bridge networks 32, 34 and 36.

Figure 2:
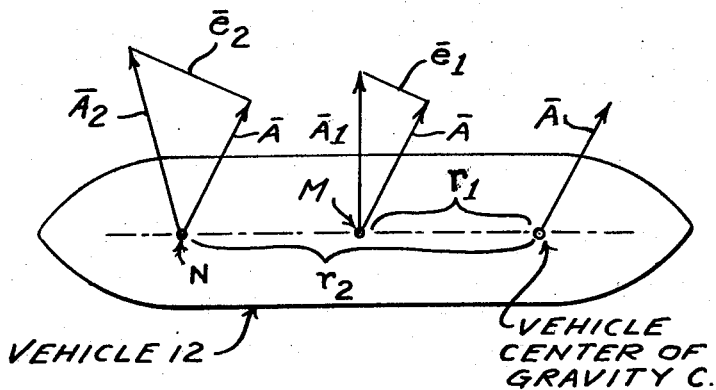
FIG. 2 is a diagram representing the general and arbitrary movement of a vehicle relative to an axis of the vehicle.

A general assumption is made that in FIG. 2, the sensor system 10 as detailed in FIG. 1 cannot be located at a pertinent point C in the vehicle 12, such as its center of gravity. For providing the acceleration of the vehicle at point C, one of two of the sensor systems 10 is positioned at a convenient location M having a displacement $r_1$ from the point. C and the other sensor systems is positioned at another convenient location N having a displacement $r_2$ from the point C.

In FIG. 2, the absolute acceleration of the vehicle at point C is represented by a vector $\bar{A}$ while the absolute accelerations of points M and N are represented by the vectors $\bar{A}_1$ and $\bar{A}_2$, respectively. The absolute accelerations $\bar{A}_1$ and $\bar{A}_2$ may each be resolved into two rectangular components, one of which is the vector $\bar{A}$ and the other is a vector representing the acceleration due to the rotation of the point about the point C. Hence vector $\bar{e}_1$ represents the relative acceleration of point M about the point C and vector $\bar{e}_2$ represents the relative acceleration of point N about the point C, the magnitudes of vectors $\bar{e}_1$ and $\bar{e}_2$ being proportional to the radial distances $r_1$ and $r_2$ from the points M and N to the point C, respectively. Hence;

At point M, $\quad \bar{A}_1 = \bar{A} + \bar{e}_1 \quad$ (1)
At point N, $\quad \bar{A}_2 = \bar{A} + \bar{e}_2 \quad$ (2)
and;

$$\bar{e}_2 = \bar{e}_1 (r_2/r_1) \quad (3)$$

Subtracting equation (2) from (1), $$\bar{A}_1 - \bar{A}_2 = \bar{e}_1 - \bar{e}_2 = \bar{e}_1 \left(1 - \frac{r_2}{r_1}\right) \quad (4)$$

$$\bar{e}_1 = \left(\frac{1}{1 - r_2/r_1}\right) (\bar{A}_1 - \bar{A}_2) \quad (5)$$

From equation (1)

$$\bar{A} = \bar{A}_1 - \bar{e}_1 \quad (6)$$

or;

$$\bar{A} = \bar{A}_1 - \left(\frac{1}{1 - r_2/r_1}\right) (\bar{A}_1 - \bar{A}_2) \quad (7)$$

Figure 3:
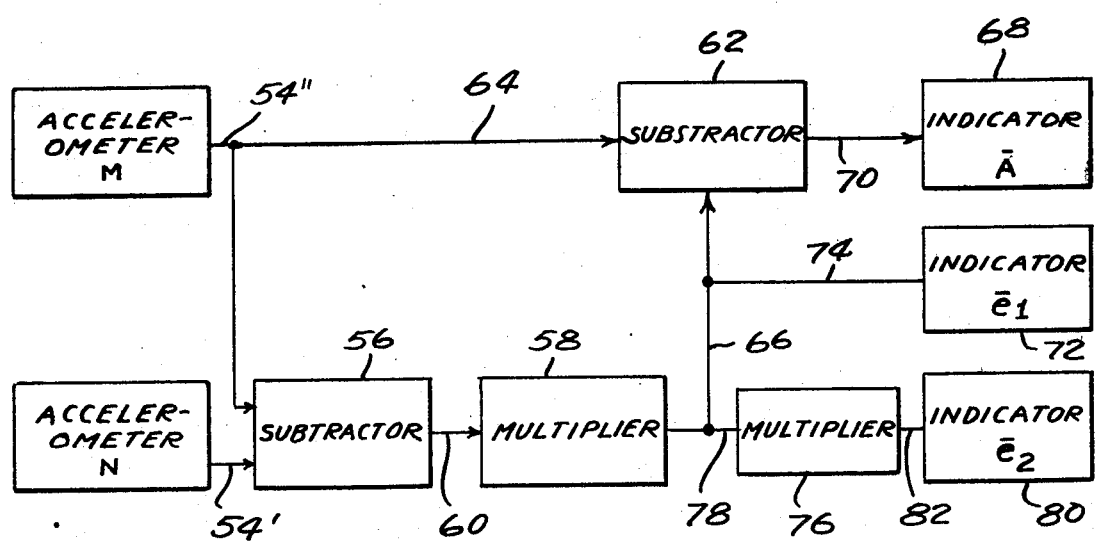
FIG. 3 is a block diagram of equipment for providing the absolute acceleration of the vehicle at its center of gravity from measurements by sensors located at two other points in the vehicle; and additionally, providing the relative acceleration of the vehicle at the sensor points about the center of gravity.

The instrumentation suggested by the formula (7) is shown as a block diagram in FIG. 3 for providing the acceleration $\bar{A}$ of the vehicle 12 at its center of gravity C by omnidirectional acceleration measurements at points M and N.

In FIG. 3, accelerometers M and N are identical and each comprise, as shown in FIG. 1, a sensor system 10, balanced bridge networks 32, 34 and 36, amplifiers 38, 40 and 42. When the masses 11 of the sensor systems 10 are positioned at points M and N, respectively, the cables 54' and 54' transmit the X, Y and Z components of the informational quantities $\bar{A}_1$ and $\bar{A}_2$, respectively. A subtractor 56 is connected at its input side to the cables 54 and 54' being arranged to subtract corresponding components of $\bar{A}_1$ and $\bar{A}_2$ and yield components of the informational quantity $(\bar{A}_1 - \bar{A}_2)$ to a multiplier 58 by a cable 60 connected therebetween. The multiplier 58 performs the operation of multiplying each component of the quantity $(\bar{A}_1 - \bar{A}_2)$ by the factor $1/1 - r_2/r_1$. It is to be noted that the multiplier 58 may be eliminated when $r_2$ is equal to twice $r_1$. A subtracter 62 is connected at its input side to the accelerometer M and to the multiplier 58 by cables 64 and 66, respectively for yielding x, y and z components of the informational quantity $$\bar{A}_1 - \left(\frac{1}{1 - r_2/r_1}\right) (\bar{A}_1 - \bar{A}_2)$$

to an indicator 68 by a cable 70 connected therebetween, the informational quantity being equal to the acceleration $\bar{A}$ of point C as shown by the equation (7). This quantity is obtainable as by a following vector solver adapted to combine vertically the components of acceleration placed in the indicator 68.

From equation (5), it can be seen that an indicator 72 connected to the multiplier 58 by a cable 74 will yield the relative acceleration $\bar{e}_1$ of the vehicle 12 at point M about the vehicle center of gravity C.

Additionally, in FIG. 3 is shown a multiplier 76 connected to the output side of the multiplier 58 by a cable 78, multiplier 76 being adapted to multiply its input information by the factor $(r_2 / r_1)$. From equation (3), it can be seen that an indicator 80 connected to the multiplier 76 by a cable 82 will yield the relative acceleration $\bar{e}_2$ of the of the vehicle 12 at point N about the vehicle center of gravity C.

It is to be understood that various modifications of the invention other than those above described may be effected by persons skilled in the art without departing from the principle and scope of the invention as defined in the appended claims.

What is claimed is:

1. An accelerometer for providing the acceleration of a vehicle at a first point therein, comprising a first means for yielding the acceleration $\bar{A}_1$ of the vehicle at a second point disposed at a distance $r_1$ from the first point, a second means for yielding the acceleration $\bar{A}_2$ of the vehicle at a third point disposed at a distance $r_2$ from the first point, and computing means connected to said first and second means for yielding the acceleration $\bar{A}$ of the vehicle at the first point in accordance with the formula $$\bar{A} = \bar{A}_1 - \left(\frac{1}{1 - r_2/r_1}\right) (\bar{A}_1 - \bar{A}_2)$$

$\bar{A}_1$ being equal to $\bar{A} + \bar{e}_1$, $\bar{A}_2$ being equal to $\bar{A} + \bar{e}_2$ and $\bar{e}_2$ being equal to $\bar{e}_1 r_2/r_1$ where $\bar{e}_1$ is the acceleration of the second point about the first point and $\bar{e}_2$ is the acceleration of the third point about the first point.

2. An accelerometer as claimed in claim 1 wherein said computing means includes a first subtracter connected at its input side to said first and second means, a second subtracter connected at its input side to said first means and said first subtracter and a multiplier connected between said first and second subtracters, said multiplier being adapted to multiply the information from said first subtracter by the factor $1/1-r_2/r_1$.

3. An accelerometer as claimed in claim 1 wherein said first means comprises a mass, means for resisting the displacement of said mass from the second point by applying in accordance with said displacement a force to the said mass along each of three mutually perpendicular axes intersecting at the center of gravity of said mass, said resisting means including an element disposed substantially in parallel with each of the three mutually perpendicular axes, each element having a variable electrical characteristic controlled by the displacement of said mass, and vector solving means connected to the said elements for yielding the acceleration of said vehicle at the second point in accordance with the formula $\sqrt{x^2+y^2+z^2}$, wherein $x$, $y$ and $z$ are the respective changes in the electrical characteristics of each of the said elements.

4. An accelerometer as claimed in claim 3 wherein each of said elements is a variable resistor.

5. An accelerometer as claimed in claim 3 wherein said resisting means includes a pair of springs disposed along each of the axes, one end of each spring in each pair of springs being connected to opposite sides of said mass, the other ends of said springs being connected to the vehicle so as to provide suspension for said mass.

6. An accelerometer as claimed in claim 5 wherein there are provided a plurality of balancing bridge networks, each of said networks having one of said elements in its bridge arms and being connected on its output side to the input side of said vector solving means.

7. An accelerometer for providing the acceleration $\bar{e}_1$ of a vehicle at a first point about a second point in the vehicle with said first point being displaced at a distance $r_1$ from said second point, comprising a first means for yielding the acceleration $\bar{A}_1$ of the vehicle at the second point, a second means for yielding the acceleration $\bar{A}_2$ of the vehicle at a third point disposed in the vehicle at a distance of $r_2$ from the second point, and computing means connected to said first and second means for yielding the acceleration $\bar{e}_1$ of the vehicle at the first point about the second point in accordance with the formula $$\bar{e} = \left(\frac{1}{1-r_2/r_1}\right)(\bar{A}_1 - \bar{A}_2).$$

8. An accelerometer as claimed in claim 7 wherein said computing means includes a subtracter connected at its input side to the said first and second means, and a multiplier connected at its input side to said subtracter, said multiplier being adapted to multiply the output of said subtracter by the factor $1/1-r_2/r_1$.

9. An accelerometer as claimed in claim 8 wherein a second multiplier is connected at its input side to the said multiplier, said second multiplier being adapted to multiply the output of said multiplier by the factor $r_2/r_1$ for yielding the acceleration $\bar{e}_2$ of the third point about the second point.

* * * * *